(12) United States Patent
Horng et al.

(10) Patent No.: US 6,724,120 B1
(45) Date of Patent: Apr. 20, 2004

(54) STATOR WITH RADIAL WINDING

(75) Inventors: Alex Horng, Kaohsiung (TW);
Ching-Sheng Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/256,083

(22) Filed: Sep. 27, 2002

(51) Int. Cl.$^7$ .................................................. H02K 1/00
(52) U.S. Cl. ........................ 310/216; 310/258; 310/259
(58) Field of Search ................................. 310/216, 214, 310/217, 218, 254, 258, 259, 67 R

(56) References Cited

U.S. PATENT DOCUMENTS

| | | | |
|---|---|---|---|
| 5,331,245 A | * | 7/1994 | Burgbacher et al. ........ 310/186 |
| 5,525,852 A | * | 6/1996 | Fanning et al. ............. 310/217 |
| 5,604,389 A | * | 2/1997 | Nitta et al. ................ 310/67 R |
| 5,760,512 A | * | 6/1998 | Ohi et al. ..................... 310/91 |
| 5,798,583 A | * | 8/1998 | Morita ......................... 310/42 |
| 6,242,835 B1 | * | 6/2001 | Uemura et al. ............. 310/214 |

* cited by examiner

*Primary Examiner*—Thanh Lam
(74) *Attorney, Agent, or Firm*—Bacon & Thomas, PLLC

(57) ABSTRACT

A stator with radial winding invention comprises a single pole plate formed by punching a plate having excellent conductivity in magnetism and having an appropriate thickness. The pole plate includes a central tubular portion defining a central hole. A plurality of pole arms project from an outer periphery of the tubular portion and extend radially. Each pole arm terminates at an edge. At least one pole face projects from each edge and extends along a direction perpendicular to a plane on which the edge lies.

9 Claims, 3 Drawing Sheets

STATOR WITH RADIAL WINDING

BACKGROUND OF THE INVENTION

1. Field of the Invention

The invention relates to a stator including a single pole plate having a radial winding, the pole plate being formed by means of punching a plate.

2. Description of the Related Art

FIG. 1 of the drawings illustrates a conventional stator with radial winding. The stator 90 includes a plurality of laminated pole plates 91 and coils 92 wound around the pole arms of the stator 90. The stator 90 includes a central hole 93 for engaging with an axle tube 94. In manufacture of the stator 90, a plurality of pole plates 91 are formed by punching, and the pole plates 91 are then laminated. Thus, manufacture of the stator 90 is time-consuming and is costly in material.

SUMMARY OF THE INVENTION

It is the primary object of the present invention to provide a stator with radial winding, wherein the stator includes a single pole plate that is formed by means of punching a plate. Thus, the stator can be easily and rapidly manufactured.

A stator with radial winding in accordance with the present invention comprises a single pole plate formed by means of punching a plate having excellent conductivity in magnetism and having an appropriate thickness. The pole plate includes a central tubular portion defining a central hole. A plurality of pole arms project from an outer periphery of the tubular portion and extend radially. Each pole arm terminates at an edge. At least one pole face projects from each edge and extends along a direction perpendicular to a plane on which the edge lies.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
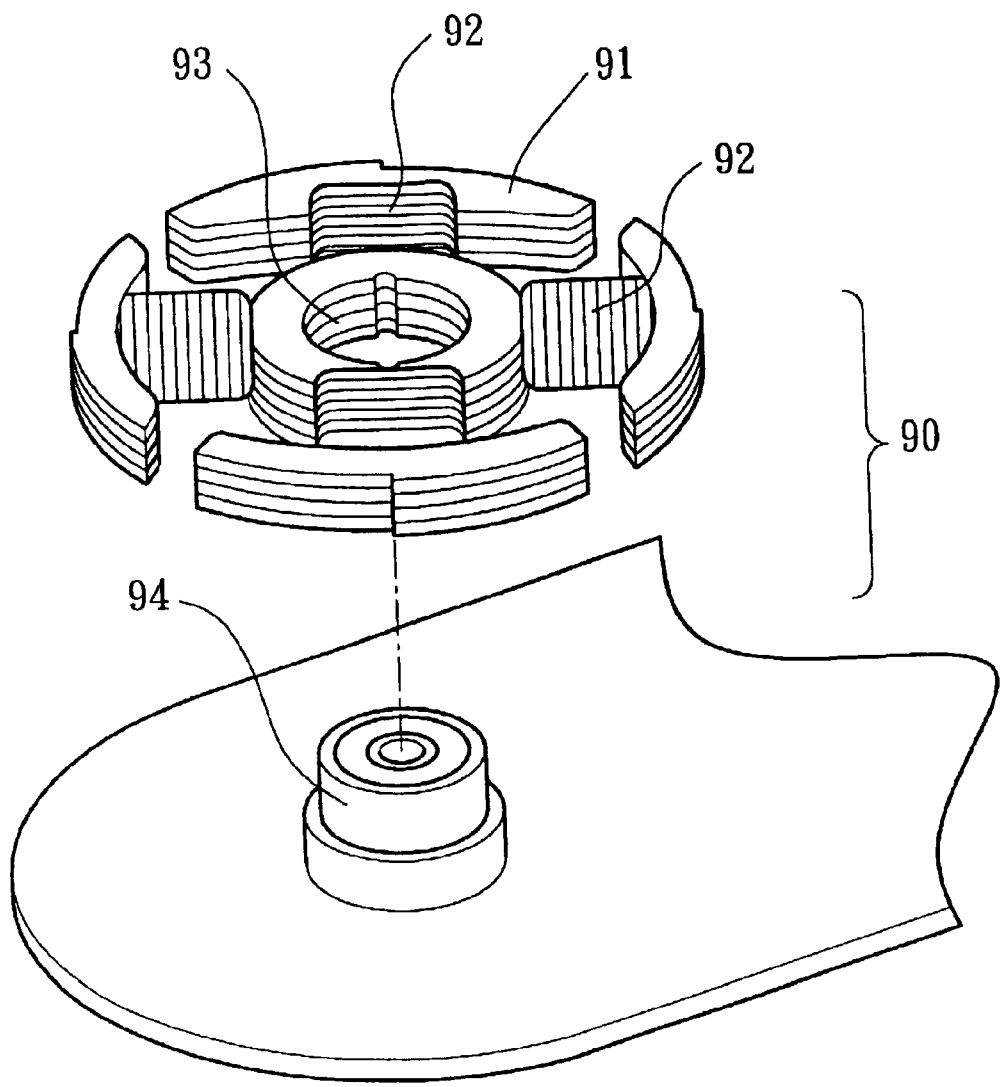
FIG. 1 is an exploded perspective view of a conventional stator with radial winding.
Figure 2:
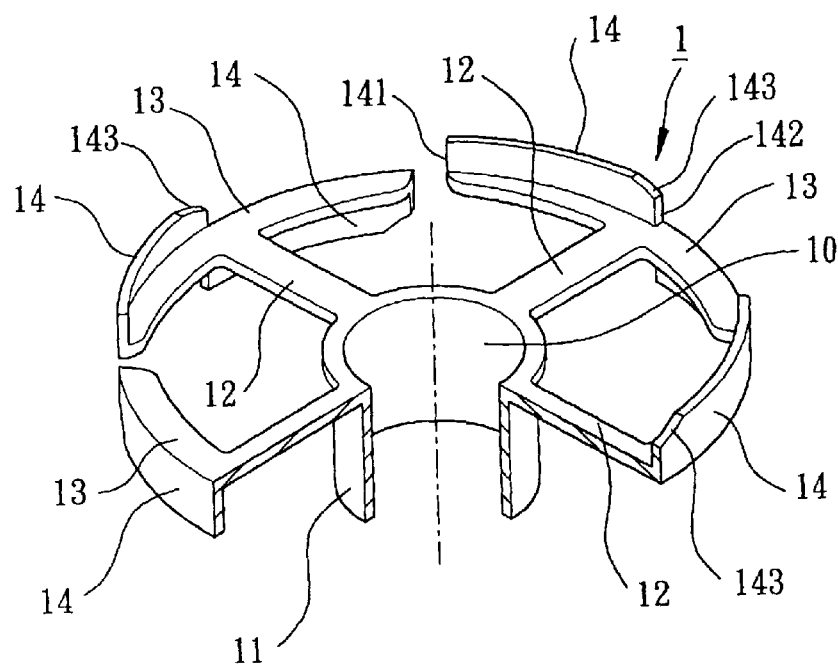
FIG. 2 is a perspective view, partly cutaway, of a first embodiment of a stator with radial winding in accordance with the present invention.

Referring to FIG. 2, a first embodiment of the a stator with radial winding in accordance with the present invention includes a single pole plate 1 made of a material with excellent conductivity in magnetism. The pole plate 1 is formed by means of punching a plate with an appropriate thickness. The pole plate 1 is therefore made of a single magnetically conductive plate integrally formed with a central tubular portion 11 defining a central hole 10 and a plurality of pole arms 12 projecting from an end of an outer periphery of the central tubular portion 11 and extending radially. Each pole arm 12 terminates at an edge 13 extending along a circumferential direction and having an appropriate length. At least one pole face 14 integrally projects from each edge 13 and extends along a direction perpendicular to a plane on which the edge 13 lies. In this embodiment, a pole face 14 is formed on an underside of each edge 13 and extends along a direction perpendicular to the plane on which the edge 13 lies, and another pole face 14 is formed on an upper side of each edge 13 and extends along a direction perpendicular to the plane on which the edge 13 lies. Each pole face 14 includes two end faces 141 and 142 of different heights. In this embodiment, the end face 142 has a chamfered face 143, which prevents a rotor located around the pole faces 14 from staying within a dead angle, thereby allowing easy starting of the rotor.

Figure 3:
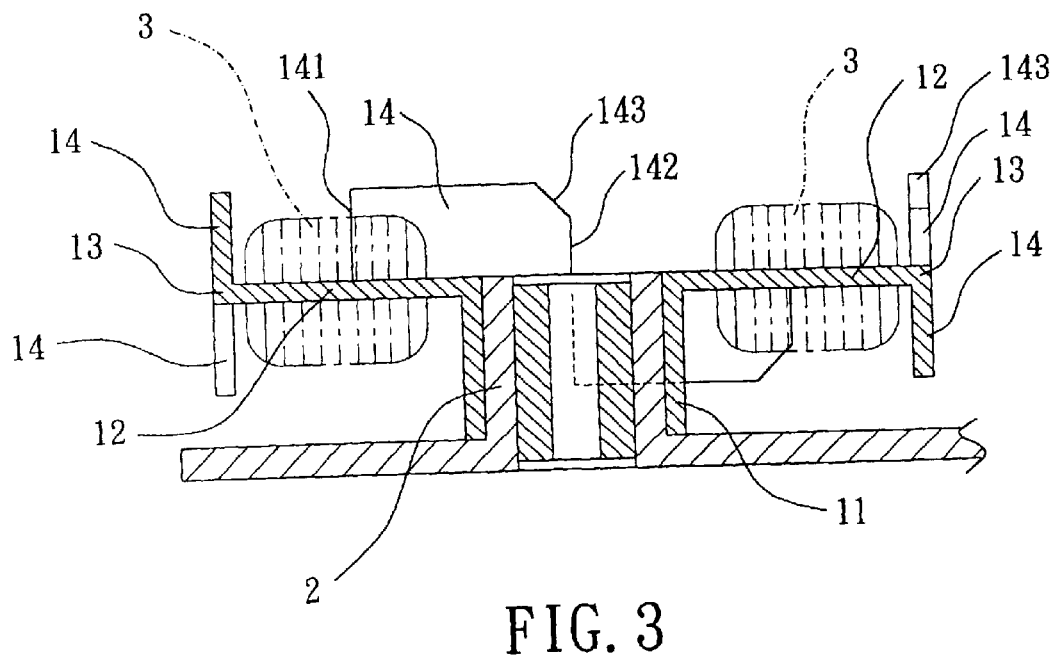
FIG. 3 is a sectional view of the stator in FIG. 2 and a casing with an axle tube to which the stator is mounted.

FIG. 3 illustrates assembly of the first embodiment of the stator in accordance with the present invention. The central tubular portion 11 of the pole plate 1 of the stator is securely mounted around an axle tube 2 of a casing or the like. A coil 3 is wound around each pole arm 12. When the coils 3 mounted around the pole arms 12 are energized, the pole faces 14 of the pole plate 1 generate magnetic forces that are repulsive to a permanent magnet mounted to the rotor, thereby driving the rotor to which the permanent magnet is mounted.

Figure 4:
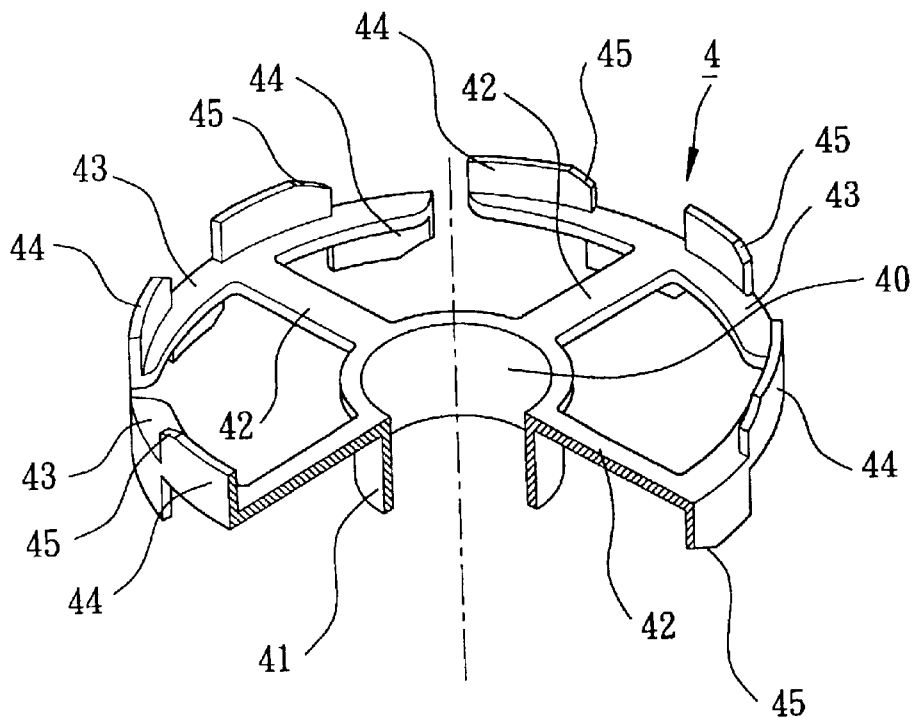
FIG. 4 is a perspective view, partly cutaway, of a second embodiment of the stator with radial winding in accordance with the present invention.

FIG. 4 illustrates a second embodiment of the stator with radial winding in accordance with the present invention. The stator including a single pole plate 4 made of a material with excellent conductivity in magnetism. The pole plate 4 is formed by means of punching a plate with an appropriate thickness. The pole plate 4 is therefore made of a single magnetically conductive plate integrally formed with a central tubular portion 41 defining a central hole 40 and a plurality of pole arms 42 projecting from an end of an outer periphery of the central tubular portion 41 and extending radially. Each pole arm 4 terminates at an edge 43 extending along a circumferential direction and having an appropriate length. At least one pole face 44 integrally projects from each edge 43 and extends along a direction perpendicular to a plane on which the edge 43 lies. In this embodiment, two pole faces 44 are formed on an underside of each edge 43 and extend along a direction perpendicular to the plane on which the edge 43 lies, and two pole faces 44 are formed on an upper side of each edge 43 and extend along a direction perpendicular to the plane on which the edge 43 lies. Each pole face 44 includes two end faces of different heights. In this embodiment, each pole face 44 has a chamfered face 45, which prevents a rotor located around the pole faces 44 from staying within a dead angle, thereby allowing easy starting of the rotor.

Figure 5:
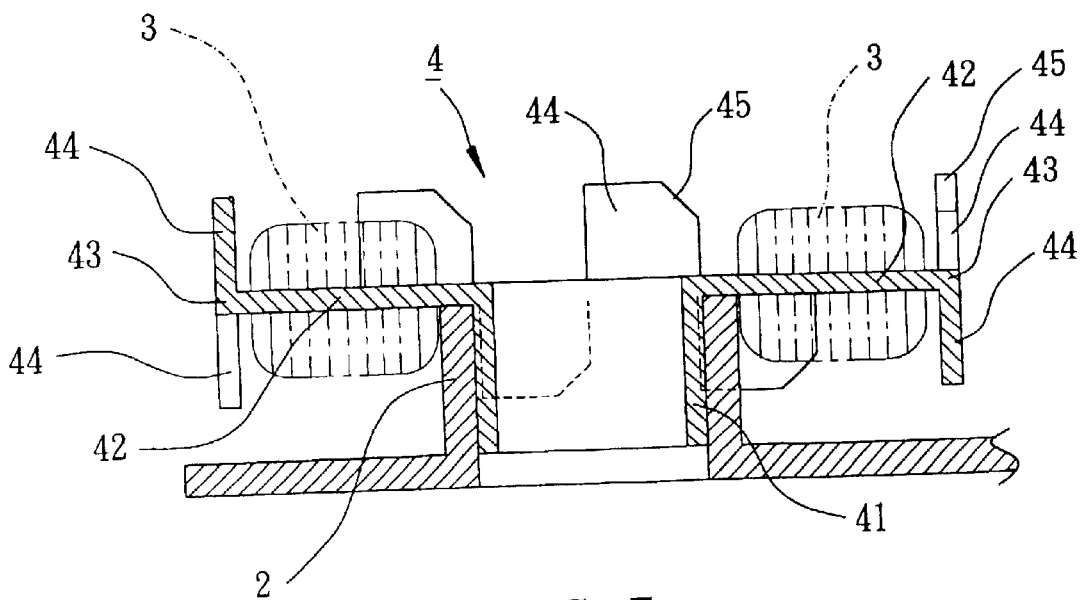
FIG. 5 is a sectional view of the stator in FIG. 4 and a casing with an axle tube to which the stator is mounted.

FIG. 5 illustrates assembly of the second embodiment of the stator in accordance with the present invention. The central tubular portion 41 of the pole plate 4 of the stator is securely mounted around an axle tub 2 of a casing or the like. A coil 3 is wound around each pole arm 42. When the coils 3 mounted around the pole arms 42 are energized, the pole faces 44 of the pole plate 4 generate magnetic forces that are repulsive to a permanent magnet mounted to the rotor, thereby driving the rotor to which the permanent magnet is mounted.

According to the above description, it is appreciated that the stator in accordance with the present invention includes a single pole plate 1, 4 that can be easily and rapidly formed. Since the edge 13, 43 of each pole arm 12, 42 of the pole plate 1, 4 includes upright pole faces 14, 44, an excellent magnetic induction effect is provided for the pole plate 1, 4 and the permanent magnet on the rotor while providing improved repulsive effect for driving the rotor to turn. Further, the central tubular portion 11, 41 of the pole plate 1, 4 allows easy positioning of the pole plate 1, 4.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A stator with radial winding, comprising:

a single pole plate made of a single magnetically conductive plate integrally formed with a central tubular portion defining a center hole, a plurality of pole arms integrally projecting from an outer periphery of the tubular portion and extending radially, each said pole arm terminating at an edge, at least one pole face integrally projecting from each said edge and extending along a direction perpendicular to a plane on which the edge lies; and a coil wound around each said pole arm.

2. The stator with radial winding as claimed in claim 1, wherein the single pole plate is formed by means of punching a plate.

3. The stator with radial winding as claimed in claim 1, wherein said at least one pole face is formed on an upper side of each said edge.

4. The stator with radial winding as claimed in claim 1, wherein said at least one pole face is formed on an underside of each said edge.

5. The stator with radial winding as claimed in claim 1, wherein each said pole face includes a chamfered face.

6. A stator with radial winding, the stator comprising a single pole plate formed by means of punching a plate, the pole plate being made of a single magnetically conductive plate integrally formed with a central tubular portion defining a center hole, a plurality of pole arms integrally projecting from an outer periphery of the tubular portion and extending radially, each said pole arm terminating at an edge, at least one pole face integrally projecting from each said edge and extending along a direction perpendicular to a plane on which the edge lies.

7. The stator with radial winding as claimed in claim 6, wherein each said pole face includes a chamfered face.

8. The stator with radial winding as claimed in claim 6, wherein said at least one pole face is formed on an upper side of each said edge.

9. The stator with radial winding as claimed in claim 6, wherein said at least one pole face is formed on an underside of each said edge.

* * * * *